(12) United States Patent
Park

(10) Patent No.: US 7,607,450 B2
(45) Date of Patent: Oct. 27, 2009

(54) CUT VALVE

(75) Inventor: Chun Kyu Park, Gunpo (KR)

(73) Assignee: Kia Motors Corporation, Seoul (KR)

( * ) Notice: Subject to any disclaimer, the term of this patent is extended or adjusted under 35 U.S.C. 154(b) by 373 days.

(21) Appl. No.: 11/652,278

(22) Filed: Jan. 10, 2007

(65) Prior Publication Data

US 2008/0110503 A1    May 15, 2008

(30) Foreign Application Priority Data

Nov. 14, 2006    (KR) .................. 10-2006-0112469

(51) Int. Cl.
*F16K 24/04*    (2006.01)
(52) U.S. Cl. .......................... 137/202; 137/422; 96/165
(58) Field of Classification Search .............. 137/43, 137/202, 197, 422, 429, 430; 96/158, 165
See application file for complete search history.

(56) References Cited

U.S. PATENT DOCUMENTS

| 4,753,262 | A | * | 6/1988 | Bergsma ..................... 137/39 |
| 5,755,252 | A | * | 5/1998 | Bergsma et al. ............ 137/202 |
| 5,950,659 | A | * | 9/1999 | Szlaga et al. ................ 137/202 |
| 2007/0079872 | A1 | * | 4/2007 | Leonhardt .................... 137/202 |

* cited by examiner

*Primary Examiner*—Robin O Evans
*Assistant Examiner*—Craig M Schneider
(74) *Attorney, Agent, or Firm*—Morgan, Lewis & Bockius LLP

(57) ABSTRACT

A cut valve preventing fuel overflow from a fuel tank to a fuel gas passage includes a float moving upward and downward corresponding to a surface of the fuel, a cone formed to an upper surface of the floater to move with the float, at least one link formed to an upper surface of the float to move with the float, and a cap disposed to intercept a fuel gas passage by a movement of the cone when the surface of the fuel moves upward and comprising at least one rod inserted to the at least one link.

1 Claim, 4 Drawing Sheets

CUT VALVE

CROSS-REFERENCE TO RELATED APPLICATION

This application claims priority to and the benefit of Korean Patent Application No. 10-2006-0112469 filed in the Korean Intellectual Property Office on Nov. 14, 2006, the entire contents of which are incorporated herein by reference.

BACKGROUND OF THE INVENTION (a) Field of the Invention

The present invention relates to a cut valve. More particularly, the present invention relates to a cut valve with malfunction prevention.

(b) Description of the Related Art

Generally, a cut valve is mounted for preventing fuel overflowing to a fuel vapor passage in a fuel tank of a vehicle. Conventional cut valves are typically made as Float Valves with a float that rises to close the vapor passage when the fuel level rises. In this manner fuel is prevented from entering the vapor passage. When the fuel level lowers, the float moves down under its own weight and opens the passage.

The float may have a specifically shaped mating portion configured to mate with the vapor passage inlet to improve sealing. However, if a residue of the fuel or a foreign element is exist in the fuel vapor passage inlet, a problem can occur in that the mating portion of the float is not separated from the fuel gas passage inlet 105.

In this case, further problems can occur such that the fuel tank is deformed by the fuel consumption or fuel leakage occurs.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a cut valve preventing fuel overflow from a fuel tank to a fuel gas passage including a floater moving upward and downward corresponding to a surface of the fuel, a cone formed to an upper surface of the floater to integrally move with the floater, at least one link formed to an upper surface of the floater to integrally move with the floater, and a cap disposed to intercept a fuel gas passage by a movement of the cone in a case that the surface of the fuel moves upward and comprising at least one rod inserted to the at least one link.

In a further embodiment, the cut valve further includes a lower plate guiding the floater. The at least one link includes a first link formed to pull the at least one rod in a case that the floater moves downward and a second link comprising opened one side thereof.

DETAILED DESCRIPTION OF THE EMBODIMENTS

Exemplary embodiments of the present invention will hereinafter be described in detail with reference to the accompanying drawings.

Figure 1:
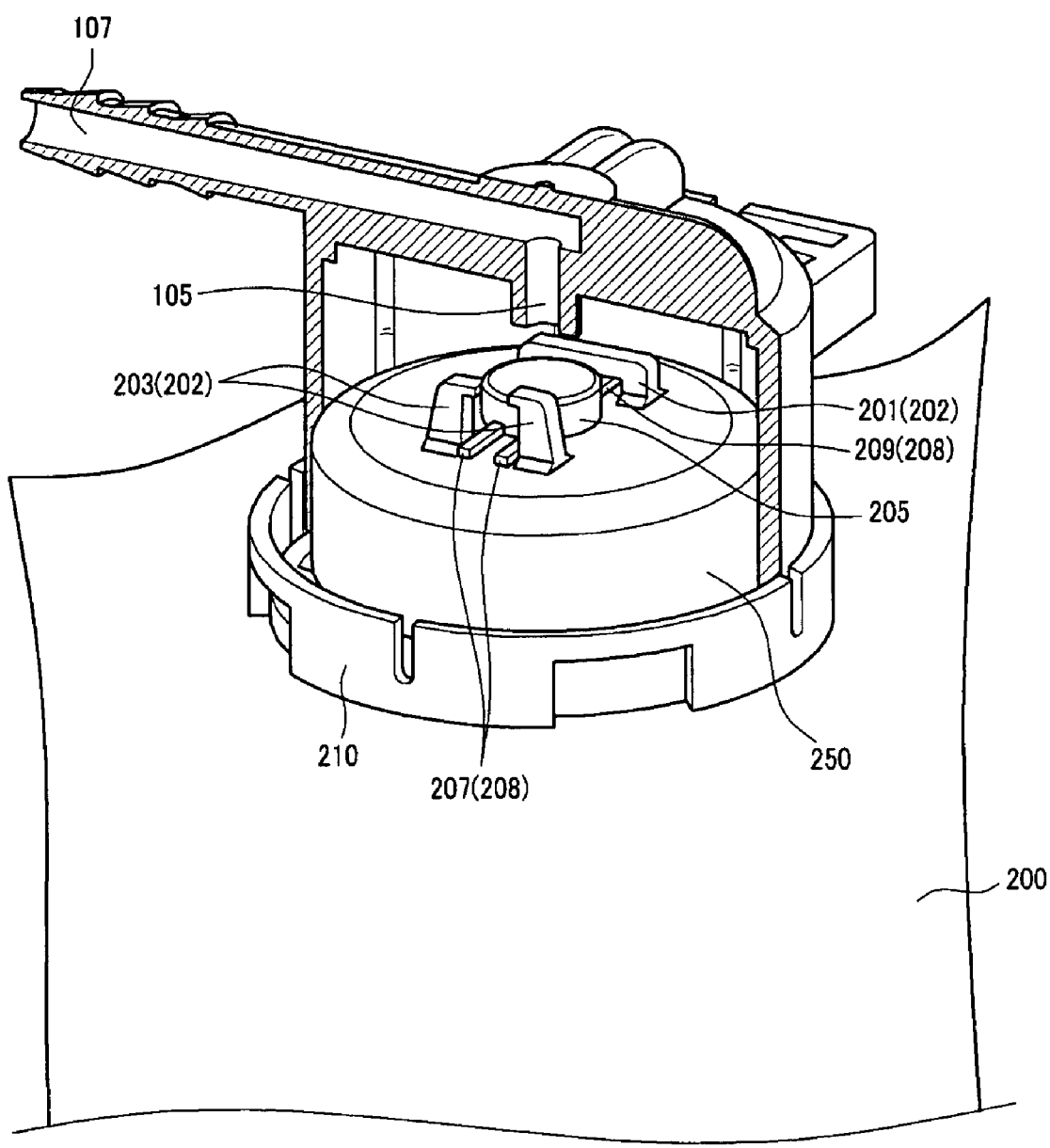
FIG. 1 is a perspective view showing a cut valve according to an exemplary embodiment of the present invention.

As shown in FIG. 1, according to an exemplary embodiment of the present invention, a cut valve for preventing fuel overflow from a fuel tank to a fuel gas passage includes a float 250, a cone 301, at least one link 203, and a cap 205. The float 250 moves upward and downward corresponding to a surface of the fuel. The cone 301 is formed at an upper surface of the float 250 to move with the float 250.

The at least one link 202 is formed at an upper surface of the float 250 to move with the float 250.

The cap 205 is disposed to intercept a fuel vapor passage by a movement of the cone 301 when the surface of the fuel moves upward. Cap 205 includes at least one rod 207 inserted to the at least one link 203.

Figure 2:
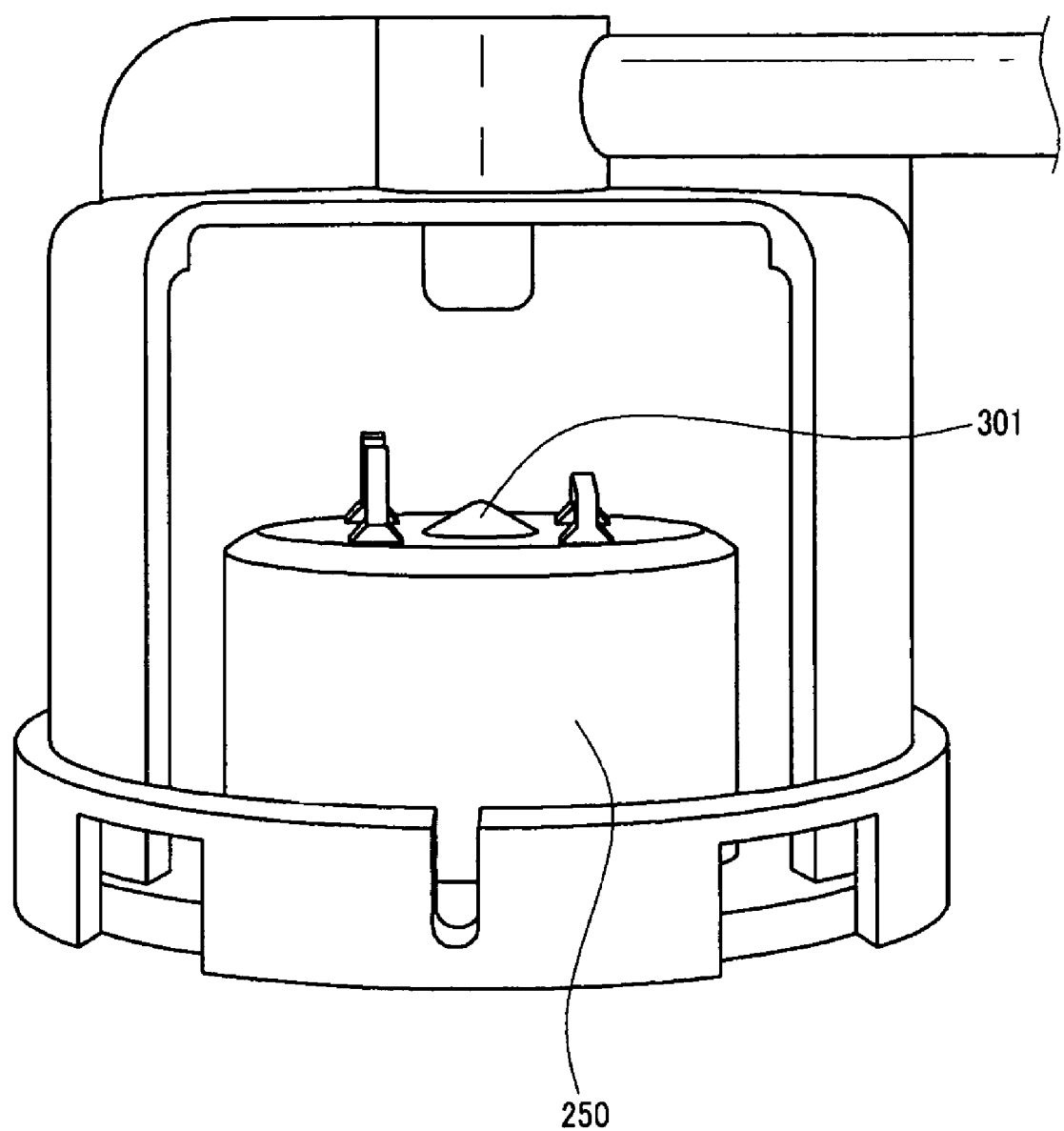
FIG. 2 shows a floater on which a cap is not mounted according to an exemplary embodiment of the present invention.
Figure 3:
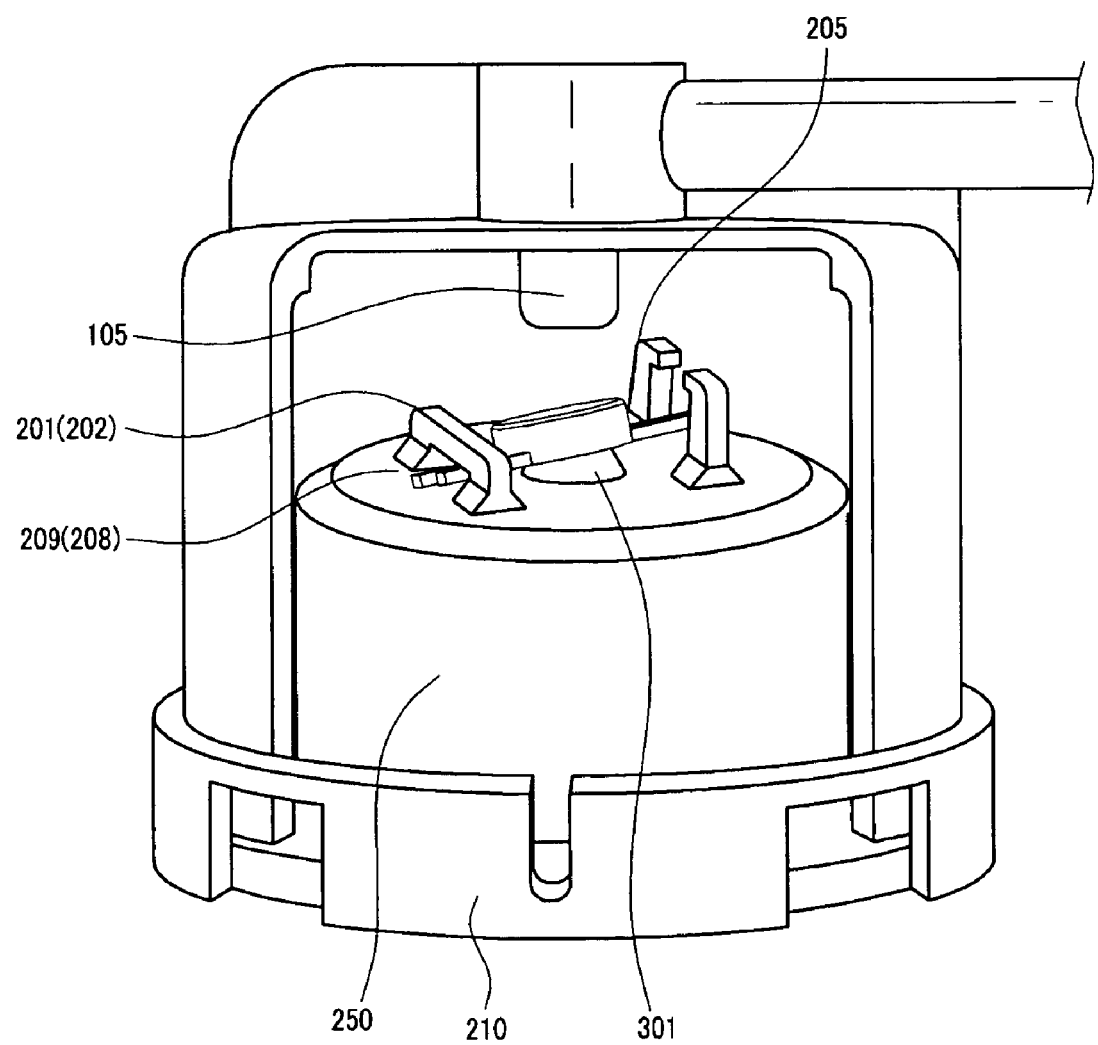
FIG. 3 and FIG. 4 show an operation of the cut valve according to an exemplary embodiment of the present invention.
Figure 4:
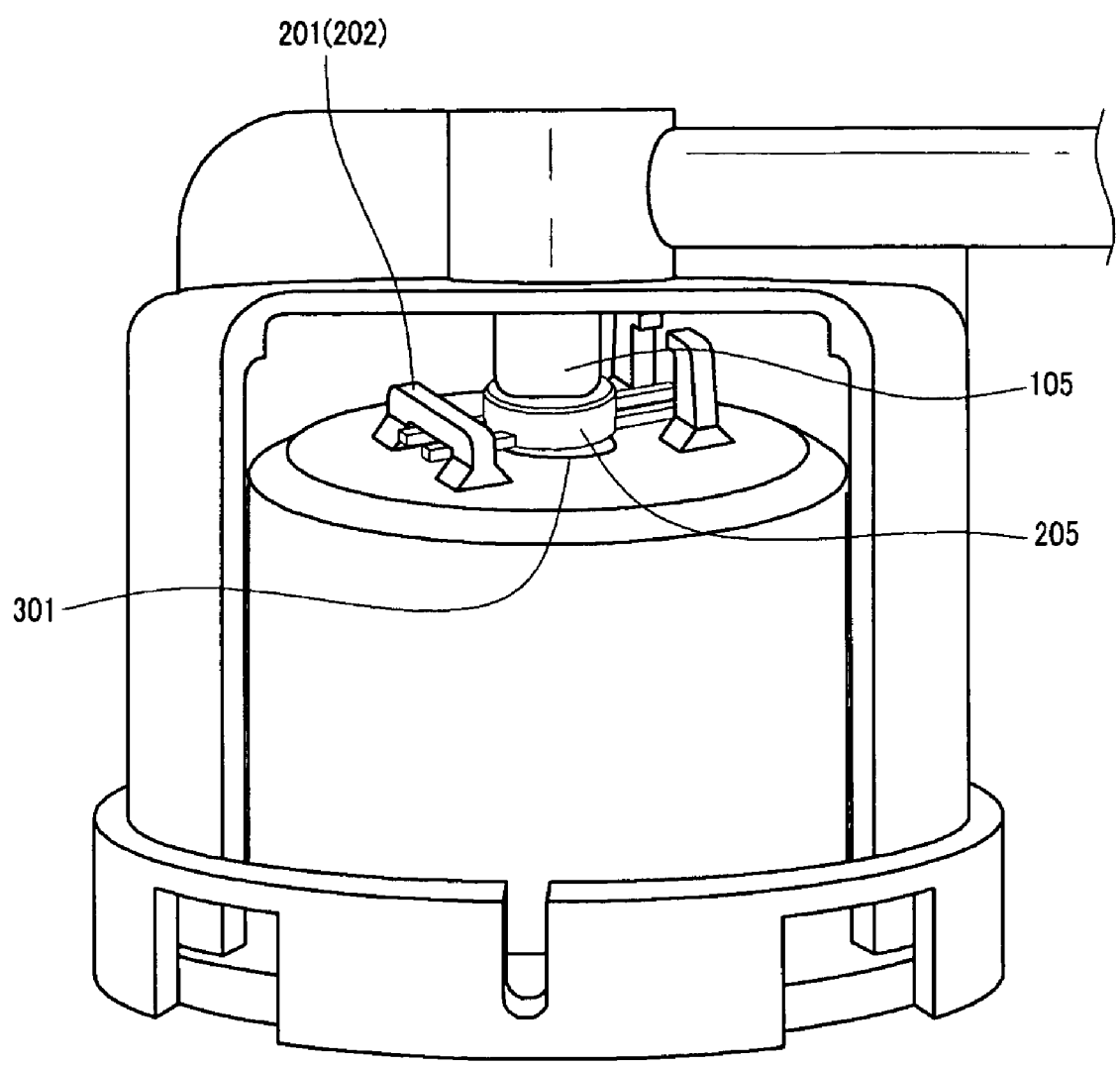

As shown in FIG. 2 and FIG. 3, the cone 301 is formed with on an upper surface of the float 250 and the cap 205 is disposed to cover the cone 301. The floater 250 is disposed to move upward or downward corresponding to the surface of the fuel of the fuel tank 200.

According to an exemplary embodiment of the present invention, the cut valve further includes a lower plate 210 guiding the float 250. That is, by the lower plate 210, the float 250 moves upward and downward along a straight line.

The at least one link 202 includes a first link 201 formed to pull the at least one rod 209 when the float 250 moves downward and a second link 203 including opened one side thereof. The at least one rod 207 includes a first rod 209 and a second rod 208. That is, the first rod 209 is disposed to the first link 201 and the second rod 207 is disposed to the second link 203.

As shown in FIG. 3, the cap 205 is positioned in a slanted state by the cone 301 when the float 250 moves downward. If the float 250 moves upward when the surface of the fuel rises, the cap 205 is positioned horizontally and intercepts the fuel gas passage inlet 105. And then, if the surface of the fuel goes down, the float 250 moves down and the first link 201 moves the first rod 209 in a downward direction.

Therefore, in a case that a residue having high viscosity or a foreign element exist in the fuel gas passage inlet 105, the cap 205 can be separated from the fuel gas passage inlet 105. Therefore, the float 250 moves back to the original position, the cap 205 also moves back to the original position.

According to an exemplary embodiment of the present invention, although a residue of the fuel or a foreign element is exist, because the cut valve can be easily opened, malfunction of the cut valve is prevented.

Therefore, a deformation of the fuel tank and fuel leakage are prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cut valve for preventing fuel overflow from a fuel tank to a fuel vapor passage, comprising:
   a float moving upward and downward corresponding to a surface of the fuel;
   a cone formed on an upper surface of the float to move with the float;

at least one link formed on an upper surface of the float to move with the float;

a cap having a dented portion wherein the cone is selectively received in the dented portion of the cap to intercept the fuel vapor passage by a movement of the cone in a case that the surface of the fuel moves upward and comprising at least one rod inserted to the at least one link, and a lower plate slidably receiving and guiding the float, wherein the at least one link comprises a first link formed to pull the at least one rod when that the float moves downward; and a second link opened at one side thereof; and wherein a height of the first link differs from a height of the second link.

* * * * *